BUNCH & PRICE.
Seed-Planter.

No. 45,971.

Patented Jan. 24, 1865.

Witnesses:
Wm Trewin
Theo. Fusch

Inventor:
Geo Bunch
J. A. Price
per Munn & Co
Attys

UNITED STATES PATENT OFFICE.

GEORGE BUNCH, OF GRAND RIVER TOWNSHIP, COUNTY OF DAVIESS, AND JAMES A. PRICE, OF BRECKENRIDGE, MISSOURI.

IMPROVED CORN-PLANTER.

Specification forming part of Letters Patent No. 45,971, dated January 24, 1865.

*To all whom it may concern:*

Be it known that we, GEORGE BUNCH, of Grand River township, in the county of Daviess and State of Missouri, and JAMES A. PRICE, of Breckenridge, in the county of Caldwell and State of Missouri, have invented a new and Improved Corn-Planter; and we do hereby declare that the following is a full, clear, and exact description thereof, which will enable others skilled in the art to make and use the same, reference being had to the accompanying drawings, forming a part of this specification, in which—

Figure 1:
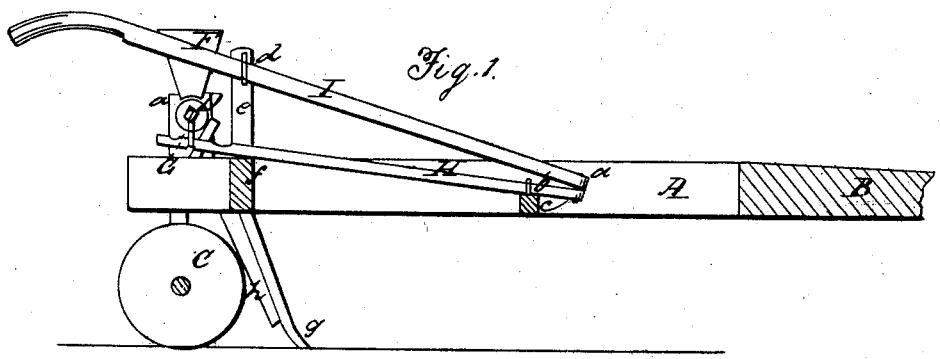
Figure 2:
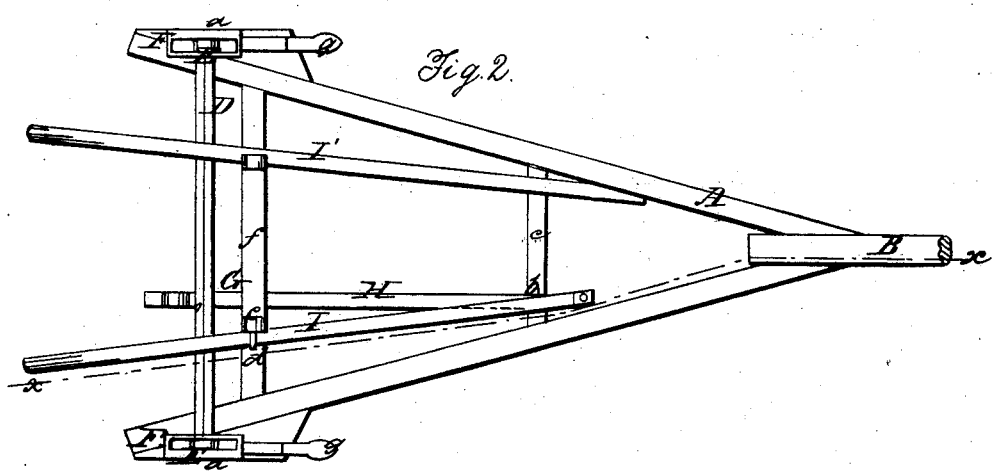

Figure 1 is a side sectional view of our invention, taken in the line $x\ x$, Fig. 2; Fig. 2, a plan or top view of the same.

Similar letters of reference indicate like parts.

This invention relates to a new and improved corn-planter of that class in which the seed-dropping mechanism is operated manually by the driver while walking behind the machine and guiding the same.

The invention consists in operating the seed-dropping mechanism directly from one of the handles of the device without the intervention of any levers or extraneous devices whatever, as hereinafter fully set forth, whereby a very simple and cheap implement of the kind specified is obtained, and one which may be manipulated with the greatest facility.

A represents a V-shaped frame having a beam or draft-bar, B, at its front end, and its rear part supported by two wheels, C C, one at each side of the frame, the front end of the latter being the pointed or angular end, as shown clearly in Fig. 2.

On the back part of the frame A there are secured two uprights, *a a*, one at each side; and D is a shaft, the bearings of which are in said uprights. This shaft has two seed-distributing wheels, E E, upon it, which are underneath seed boxes or hoppers F F, one at each side of the frame A, said wheels being provided with seed-cells and arranged in the usual or in any proper way.

The shaft D has a pendent arm, G, the lower end of which is attached to the rear part of a bar, H, the front end of the latter being connected by a pivot, *a'*, to the right handle, I, of the machine. The bar H passes through a guide, *b*, on a cross-bar, *c*, of the frame A, and the handle I also passes through a guide, *d*, attached to an upright, *e*, on a cross-bar, *f*, of the frame A.

From this description it will be seen that the handle I and bar H are allowed to slide forward and backward, and a rocking motion thereby communicated to the shaft D, and the wheels E operated to discharge the seed. The other handle, I', is stationary or fixed. The handle I is operated by the driver as the machine is drawn along. Thus by this simple arrangement we dispense with all levers and parts which have hitherto been applied to one of the handles in order to operate the seed-distributing mechanism, and therefore obtain a very simple and economical device of the kind, and one which may be manipulated with greater facility than usual.

The machine is provided with the usual furrow-openers, *g*, and seed-conveying spouts *h*.

Having thus described our invention, we claim as new and desire to secure by Letters Patent—

The sliding handle I and sliding bar H, connected together and applied to the frame A and shaft D, substantially as and for the purpose herein set forth.

JAMES A. PRICE.
GEORGE BUNCH.

Witnesses as to signature of James A. Price:
O. C. MCWILLIAMS,
SAM. RUSSELL.

Witnesses as to signature of George Bunch:
THOMAS W. REED,
MANUEL MARTIN.